US011460542B2

(12) United States Patent
Doare et al.

(10) Patent No.: US 11,460,542 B2
(45) Date of Patent: Oct. 4, 2022

(54) PHASE ROTATOR CALIBRATION OF A MULTICHANNEL RADAR TRANSMITTER

(71) Applicant: NXP USA, INC., Austin, TX (US)

(72) Inventors: Olivier Vincent Doare, La Salvetat St Gilles (FR); Stephane Damien Thuries, Saubens (FR); Gilles Montoriol, Fonsorbes (FR)

(73) Assignee: NXP USA, INC., Austin, TX (US)

( * ) Notice: Subject to any disclaimer, the term of this patent is extended or adjusted under 35 U.S.C. 154(b) by 363 days.

(21) Appl. No.: 16/670,032

(22) Filed: Oct. 31, 2019

(65) Prior Publication Data

US 2020/0158821 A1 May 21, 2020

(30) Foreign Application Priority Data

Nov. 20, 2018 (EP) .................................... 18306530

(51) Int. Cl.
*G01S 7/40* (2006.01)
*H04B 17/11* (2015.01)
*G01S 7/35* (2006.01)
*H04B 1/02* (2006.01)

(52) U.S. Cl.
CPC .............. *G01S 7/4008* (2013.01); *G01S 7/35* (2013.01); *G01S 7/40* (2013.01); *H04B 1/02* (2013.01); *H04B 17/11* (2015.01); *G01S 7/356* (2021.05); *G01S 7/358* (2021.05)

(58) Field of Classification Search
CPC ... G01S 7/32; G01S 7/40; G01S 7/356; G01S 7/358; G01S 13/42; G01S 13/89; G01S 13/931; G01S 2007/4013; H04B 1/02; H04B 17/11; H01Q 3/262
See application file for complete search history.

(56) References Cited

U.S. PATENT DOCUMENTS 3,340,400 A * 9/1967 Quittner ................. G01N 22/02
250/208.2
5,764,187 A * 6/1998 Rudish ..................... H01Q 3/26
342/372
5,812,737 A * 9/1998 Wang ..................... G10L 25/90
704/207

(Continued)

*Primary Examiner* — Peter M Bythrow
*Assistant Examiner* — Oladimeji Oyegunle

(57) ABSTRACT

Multi-channel radio frequency (RF) transmitter (100) and method of calibrating the transmitter are provided. In an embodiment, the method involves applying an intermediate frequency (IF) signal with different compensation values on a first phase rotator (128) in a first channel transmitter module (TX1) of the transmitter, wherein the different compensation values are designed to compensate for a particular phase influencing factor, applying phase codes with the same different compensation values for different phases on a second phase rotator (132) in a second channel transmitter module (TX2), measuring resultant phase errors due to phase errors of the first and second channel transmitter modules for the different compensation values, and based on the resultant phase errors, selecting one of the different compensation values to be used as a calibrated compensation value for the first and second phase rotators in the first and second channel transmitter modules to compensate for the particular phase influencing factor.

20 Claims, 17 Drawing Sheets

(56) References Cited

U.S. PATENT DOCUMENTS

| | | | |
|---|---|---|---|
| 7,782,235 B1* | 8/2010 | Velazquez | H03M 1/1052 |
| | | | 455/303 |
| 9,285,461 B2 | 3/2016 | Swirhun et al. | |
| 2014/0192923 A1* | 7/2014 | Matsuo | H01Q 3/36 |
| | | | 375/296 |
| 2014/0266345 A1* | 9/2014 | Matsumura | H03L 7/07 |
| | | | 327/158 |
| 2016/0109559 A1 | 4/2016 | Delbecq et al. | |
| 2017/0180169 A1 | 6/2017 | Doare et al. | |
| 2017/0288762 A1* | 10/2017 | Miyanaga | H01Q 3/267 |

* cited by examiner

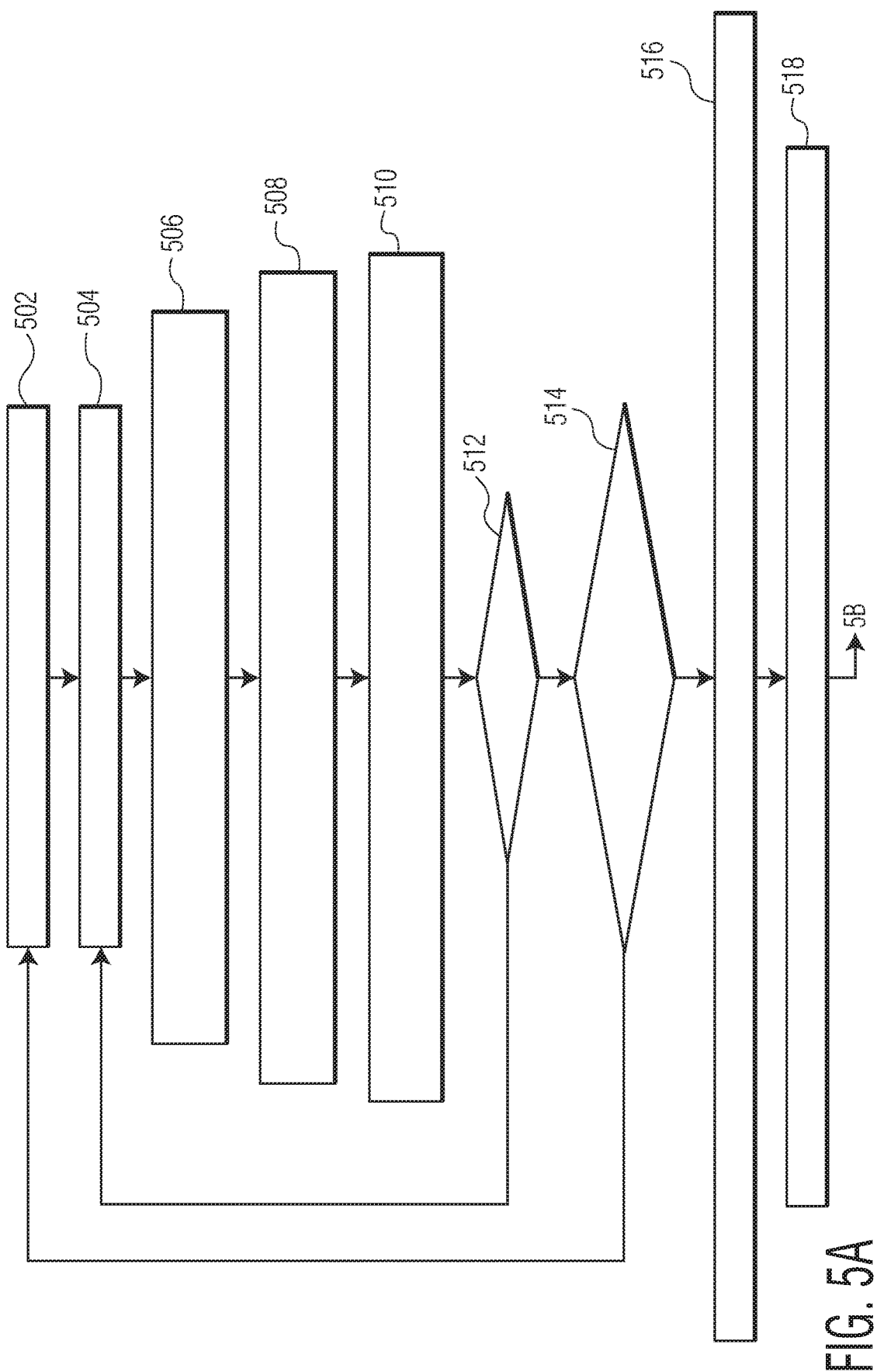

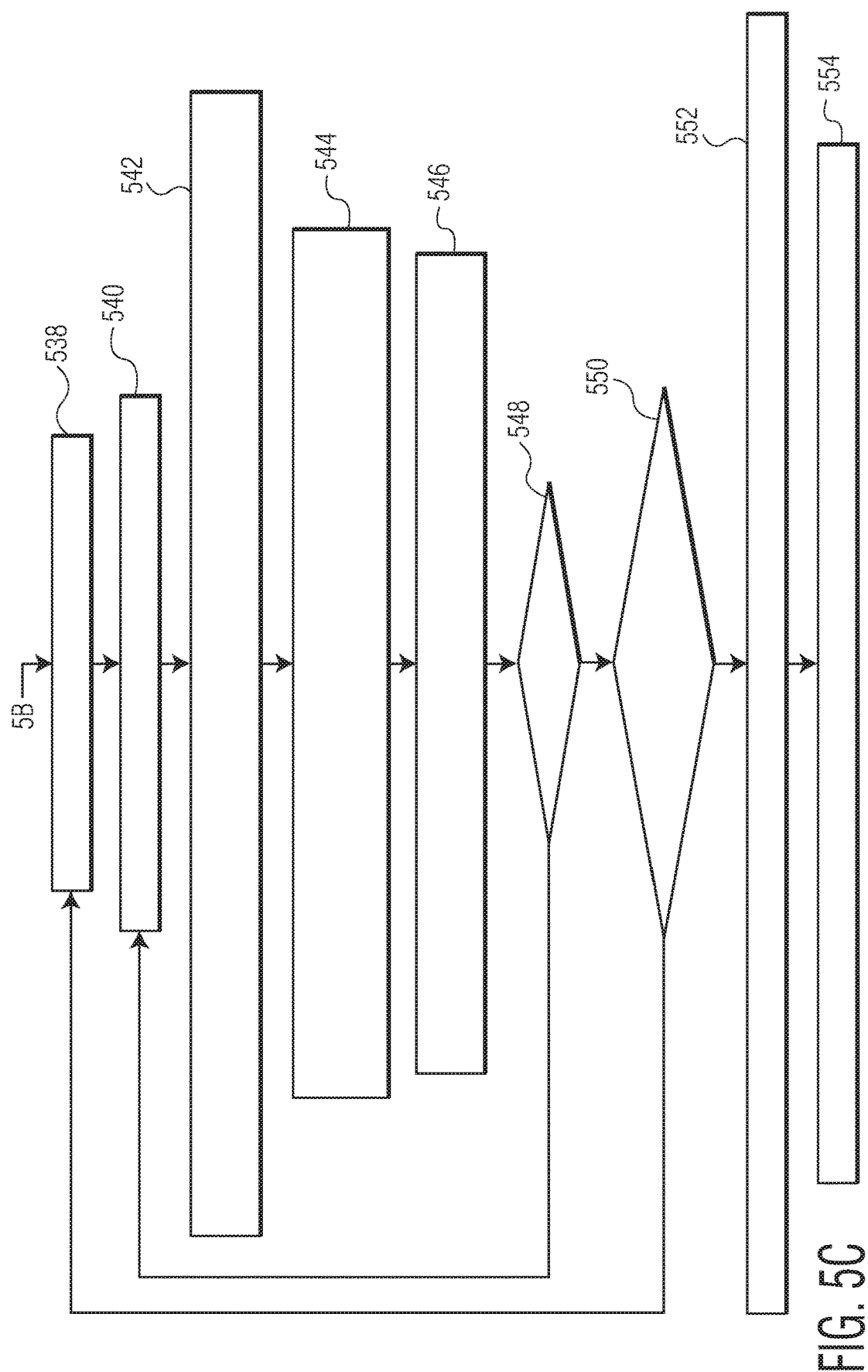

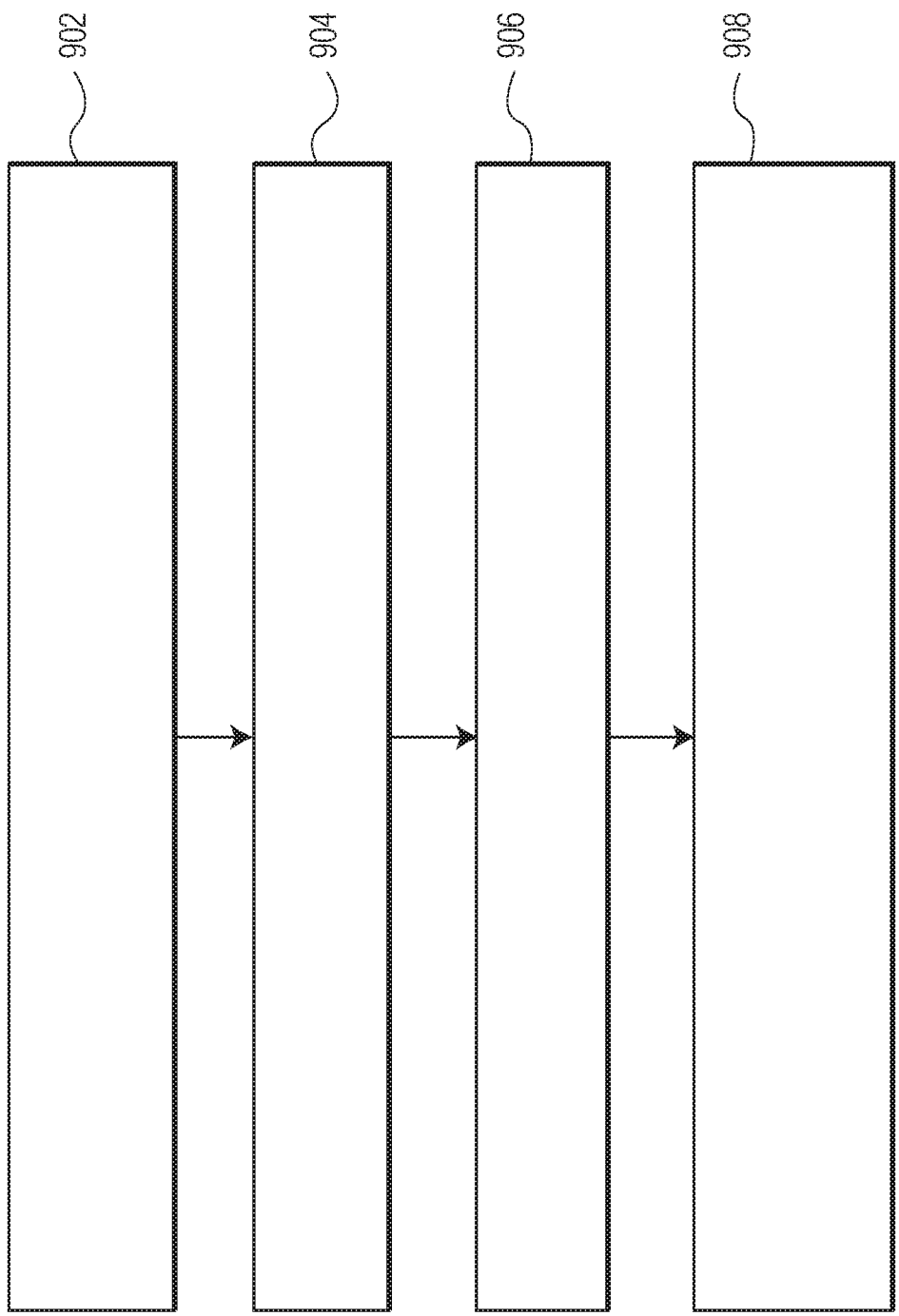

PHASE ROTATOR CALIBRATION OF A MULTICHANNEL RADAR TRANSMITTER

CROSS-REFERENCE TO RELATED APPLICATIONS

This application claims the priority under 35 U.S.C. § 119 of European Patent application no. 18306530.9, filed on 20 Nov. 2018, the contents of which are incorporated by reference herein.

Embodiments of the invention relate generally to radar system and, more particularly, to radar transmitters with phase rotator calibration capabilities.

Improving the radar is a key aspect for the next generation Frequency-Modulated Continuous-Wave (FMCW) imaging radar systems. The improvement of the range detection can be addressed by using a multi-chip transceiver using beam steering techniques. It consists in dynamically adapting the beam pattern of the antennas by changing the signal phase in real time without changing the antenna elements or other hardware. The beam steering performance depends on the accuracy of the control of the phase of each antenna. Phase and amplitude of the radiation pattern are digitally controlled through a phase shifter. Any distortions from the programmed phase and amplitude will degrade the radar performance.

SUMMARY

Multi-channel radio frequency (RF) transmitter and method of calibrating the transmitter are provided. In an embodiment, the method involves applying an intermediate frequency (IF) signal with different compensation values on a first phase rotator in a first channel transmitter module of the transmitter, wherein the different compensation values are designed to compensate for a particular phase influencing factor, applying phase codes with the same different compensation values for different phases on a second phase rotator in a second channel transmitter module of the multi-channel RF transmitter, measuring resultant phase errors due to phase errors of the first and second channel transmitter modules for the different compensation values, and selecting one of the different compensation values to be used as a calibrated compensation value for the first phase rotator in the first channel transmitter module and for the second phase rotator in the second channel transmitter module to compensate for the particular phase influencing factor.

In an embodiment, the different compensation values include DC offset values to compensate for local oscillator to RF leakage, gain values to compensate for gain imbalance, or phase values to compensate for phase imbalance.

In an embodiment, the method further comprises applying a complex I/Q signal to the first and second phase rotators from an I/Q coupler module that receives a local oscillator signal.

In an embodiment, measuring the resultant phase error includes mixing the outputs of the first and second channel transmitter modules to generate a mixed signal and performing fast Fourier transform (FFT) on the mixed signal to measure the resultant phase error.

In an embodiment, measuring the resultant phase error further includes using arctangent function on results of the FFT to measure the resultant phase error.

In an embodiment, the method further comprises converting the signal and the phase codes from digital to analog using multiple digital-to-analog converters prior to applying the signal and the phase codes to the first and second phase rotators.

In an embodiment, selecting one of the different compensation values includes summing resultant phase errors for the different compensation values to produce summed resultant phase error values corresponding to the different compensation values and selecting the minimum value from the summed resultant phase error values to select the calibrated compensation value.

In an embodiment, the method further comprises applying a particular phase code with the calibrated compensation value on the first phase rotator in the first channel transmitter module and the second phase rotator in the second channel transmitter module to produce output signals from the first and second channel transmitter modules, determining a phase misalignment between the first and second channel transmitter modules using the output signals, and providing a phase offset to compensate for the phase misalignment so that signals to the first and second channel transmitter modules are modified to phase align the first and second channel transmitter modules.

In an embodiment, the method further comprises applying the signal with the selected compensation value on the first phase rotator in the first channel transmitter module, applying the phase codes with the selected compensation value on the second phase rotator in the second channel transmitter module, measuring phase differences between outputs of the first and second channel transmitter modules, comparing the phase difference to at least one programmed threshold, and generating a flag to indicate phase drift when at least one of the phase differences is greater than the at least one programmed threshold.

A multi-channel radio frequency (RF) transmitter in accordance with an embodiment of the invention comprises a first channel transmitter module comprising a first phase rotator, a second channel transmitter module comprising a second phase rotator, a mixer to combine outputs of the first and second channel transmitter modules, and a digital processing system operatively connected to the first and second channel transmitter modules and the mixer. The digital processing system is configured to apply an intermediate frequency (IF) signal with different compensation values on the first phase rotator, wherein the different compensation values are designed to compensate for a particular phase influencing factor, apply phase codes with the same different compensation values for different phases on the second phase rotator, measure resultant phase errors due to phase errors of the first and second channel modules for the different compensation values, and based on the resultant phase errors, select one of the different compensation values to be used as a calibrated compensation value for the first phase rotator in the first channel transmitter module and for the second phase rotator in the second channel transmitter module to compensate for the particular phase influencing factor.

In an embodiment, the different compensation values include DC offset values to compensate for local oscillator to RF leakage, gain values to compensate for gain imbalance, or phase values to compensate for phase imbalance.

In an embodiment, the digital processing system is further configured to apply a complex I/Q signal to the first and second phase rotators from an I/Q coupler module that receives a local oscillator signal.

In an embodiment, the transmitter further includes an FFT module to perform FFT on a mixed signal from the mixer for a phase error measurement.

In an embodiment, the digital processing system is further configured to use arctangent function on results of the FFT to measure the resultant phase error.

In an embodiment, the transmitter further comprises a plurality of digital-to-analog converters to convert the signal and the phase codes from digital to analog prior to the signal and the phase codes being applied to the first and second phase rotators.

In an embodiment, the digital processing system is further configured to sum the resultant phase errors for the different compensation values to produce summed resultant phase error values corresponding to the different compensation values and select the minimum value from the summed resultant phase error values to select the calibrated compensation value.

In an embodiment, the digital processing system is further configured to apply a particular phase code with the calibrated compensation value on the first phase rotator in the first channel transmitter module and the second phase rotator in the second channel transmitter module to produce output signals from the first and second channel transmitter modules, determine a phase misalignment between the first and second channel transmitter modules using the output signals, and provide a phase offset to compensate for the phase misalignment so that signals to the first and second channel transmitter modules are modified to phase align the first and second channel transmitter modules.

In an embodiment, the digital processing system is further configured to apply the signal with the selected compensation value on the first phase rotator in the first channel transmitter module, apply the phase codes with the selected compensation value on the second phase rotator in the second channel transmitter module, measure phase differences between outputs of the first and second channel transmitter modules, compare the phase differences to at least one programmed threshold, and generate a flag to indicate phase drift when at least one of the phase differences is greater than the at least one programmed threshold.

A method of calibrating a multi-channel radio frequency (RF) transmitter in accordance with an embodiment of the invention comprises applying an intermediate frequency (IF) signal with different first compensation values on a first phase rotator in a first channel transmitter module of the multi-channel RF transmitter, wherein the different first compensation values are designed to compensate for a first phase influencing factor, applying phase codes with the same different first compensation values for different phases on a second phase rotator in a second channel transmitter module of the multi-channel RF transmitter, measuring first resultant phase errors due to phase errors of the first outputs of the first and second channel transmitter modules for the different first compensation values, based on the first resultant phase errors, selecting one of the different first compensation values to be used as a first calibrated compensation value for the first phase rotator in the first channel transmitter module and for the second phase rotator in the second channel transmitter module to compensate for the first phase influencing factor, applying the IF signal with the first calibrated compensation value and different second compensation values on the first phase rotator in the first channel transmitter module, wherein the different second compensation values are designed to compensate for a second phase influencing factor, applying the phase codes with the first calibrated compensation value and the same different second compensation values for different phases on the second phase rotator in the second channel transmitter module, measuring second resultant phase errors due to phase errors of the first and second channel transmitter modules for the different second compensation values, and based on the second resultant phase errors, selecting one of the different second compensation values to be used as a second calibrated compensation value for the first phase rotator in the first channel transmitter module and for the second phase rotator in the second channel transmitter module to compensate for the second phase influencing factor.

In an embodiment, the first and second different compensation values include DC offset values to compensate for local oscillator to RF leakage, gain values to compensate for gain imbalance, or phase values to compensate for phase imbalance.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

FIGS. 5A, 5B and 5C illustrate a three-step calibration process performed by the multi-channel RF transmitter in accordance with an embodiment of the invention.

FIG. 9 is a process flow diagram of a method of calibrating a multi-channel RF transmitter in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
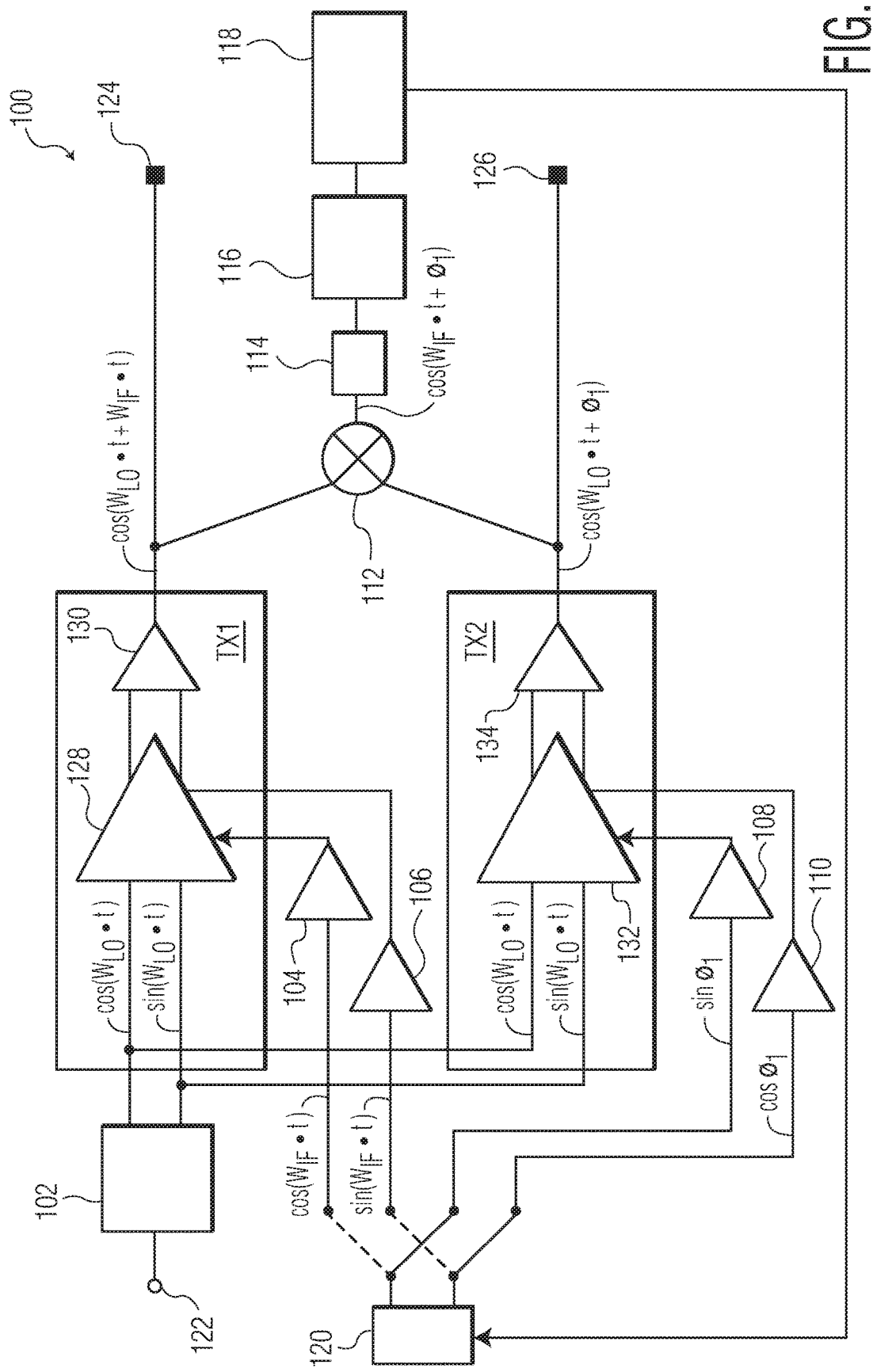
FIG. 1 is a block diagram of a multi-channel radio frequency (RF) transmitter in accordance with an embodiment of the invention.

FIG. 1 is a diagram of a multi-channel radio frequency (RF) transmitter system 100 in accordance with an embodiment of the invention. As explained below, the multi-channel RF transmitter includes mechanisms to calibrate phase rotators in the transmitter, perform phase alignment and check for phase drift to ensure that the phase rotators are performing properly. Although the multi-channel RF transmitter can be used for various application, one application of interest is a radar system for autonomous vehicles.

As shown in FIG. 1, the multi-channel RF transmitter 100 includes an I/Q coupler module 102, a first channel transmitter module TX1, a second channel transmitter module TX2, digital-to-analog converters (DACs) 104, 106, 108 and 110, a mixer 112, an analog-to-digital converter (ADC) 114 and a fast Fourier transform (FFT) module 116 and a digital processing system that includes a phase error controller 118 and a direct digital synthesizer (DDS) 120. The multi-channel RF transmitter has an input 122, which receives an input signal from a local oscillator (not shown), and outputs 124 and 126, which transmit output signals TX1_OUT and TX2_OUT from the first and second channel transmitter modules TX1 and TX2, respectively.

The I/Q coupler module 102 is connected to the input 122 to receive the input signal and convert it to a complex (I/Q) RF signal consisting of a first (I) signal component $\cos(\omega_{LO}*t)$ and a second (Q) signal component $\sin(\omega_{LO}*t)$, where $\omega_{LO}$ is the frequency of the local oscillator, which are received by the first and second channel transmitter modules TX1 and TX2.

The first channel transmitter module TX1 includes a phase shifter (also known as a phase rotator) 128 and a power amplifier 130. The phase shifter receives the complex (I/Q) RF signal from the I/Q coupler module 102. The phase shifter 128 also receives an intermediate frequency (IF) signal from the DDS 120 via the DACs 104 and 106, which in the example shown in FIG. 1 is dynamically applied to the phase shifter 128 and consists of a first IF signal component $\cos(\omega_{IF}*t)$ and a second IF signal component $\sin(\omega_{IF}*t)$, where $\omega_{IF}$ is the frequency of IF signal, $\cos(2\pi f_0*t)$, where $f_0$ is in the order of MHz, which can be defined by the equation $$f_0 = \frac{FS_{DDS} * cmd}{2^{\wedge}16} = \frac{FS\_ADC}{npts\_fft} * k,$$

where $FS_{DDS}$ is the sampling frequency of the DDs, cmd is the digital control of the DDS 120, which is used to program the wanted IF frequency, FS_ADC is the sampling frequency of the ADC 114, npts_fft is the number of points used in the discrete Fourier transform, and k is an integer. In the example shown in FIG. 1, the first and second channel transmitter modules TX1 and TX2 are both being calibrated at the same time. The output of the first channel transmitter module TX1 in this example is a signal $\cos(\omega_{LO}*t+\omega_{IF}*t)$, which is amplified by the power amplifier 130, and transmitted to the mixer 112 for calibration. During normal operations, the output of the power amplifier 130 would be transmitted to the output 124.

The second channel transmitter module TX2 includes a phase shifter or rotator 132 and a power amplifier 134. The phase shifter 134 also receives the complex (I/Q) RF signal from the I/Q coupler module 102. The phase shifter 132 also receives a phase code signal from the DDS 120 via the DACs 108 and 110, which in the example shown in FIG. 1 is statically applied to the phase shifter 134 and consists of a first phase shift signal component $\cos(\phi_1)$ and a second phase shift to signal component $\sin(\phi_1)$, where $\phi_1$ is the wanted phase code that is applied on the phase rotator. The output of the second channel transmitter module TX2 is a signal $\cos(\omega_{LO*t}+\phi_1)$, which is amplified by the power amplifier 134, and transmitted to the mixer 112 for calibration. Again, during normal operations, the output of the power amplifier 132 would be transmitted to the output 124.

The mixer 112 is connected to the outputs of the power amplifiers 130 and 134 to receive the amplified signals from the first and second channel transmitter modules TX1 and TX2. The output of the mixer 112 is connected to the ADC 114, where mixed analog signal $\cos(\omega_{IF}*t+\phi_1)$ from the mixer in the illustrated example is converted to a digital signal. The FFT module 116 is connected to the ADC 114 to receive the digital signal and execute FFT on the digital signal, in an embodiment, the FFT module 116 executes 16 points FFT on the digital signal. As an example, the FFT module may use a frequency bin of 2.5 MHz for a 40 MHz range. The output of the FFT module is used by the phase error controller 118, as explained below. The phase error controller 118 can be any digital signal processing device, such as a microcontroller or a digital processor. The operations performed by the phase error controller 118 will be described below.

The first and second channel transmitter modules TX1 and TX2 provide output signals with phase rotations. There are various influences on the phase rotations provided by the first and second channel transmitter modules TX1 and TX2, in particular, the phase shifters or rotators 128 and 132, that may cause phase error, as described below.

Figure 2A:
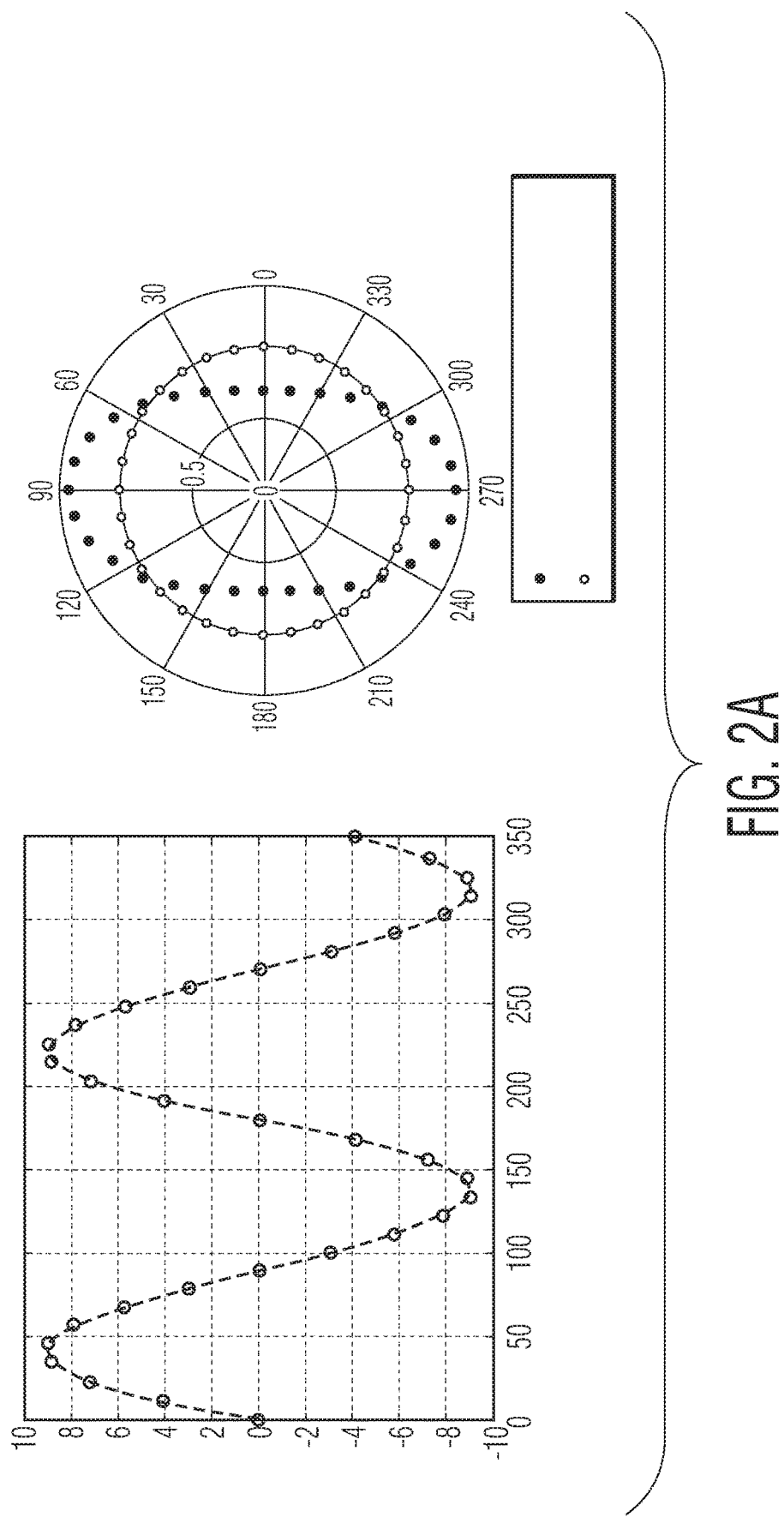
FIG. 2A illustrates the influence of phase rotator gain imbalance on phase error at a mixer of the multi-channel RF transmitter.

The first influence of interest is the influence of phase rotator gain imbalance on phase error. This influence is illustrated in FIG. 2A, which illustrates phase errors of +/−9 degrees caused by gain imbalance of 2.8 dB. With this gain imbalance, the output phase is defined by [cos(LO) cos(φ)− (2.8 dB)*sin(LO) sin(φ)]. The left graph in FIG. 2A is a graph of phase errors over different phase codes from 0 to 360 degrees, which shows phase errors of +/−9 degrees. The right graph in FIG. 2A is a polar coordinate graph showing points for an ideal signal versus points for a signal with phase rotator gain imbalance at the mixer 112 of the multi-channel RF transmitter 100.

Figure 2B:
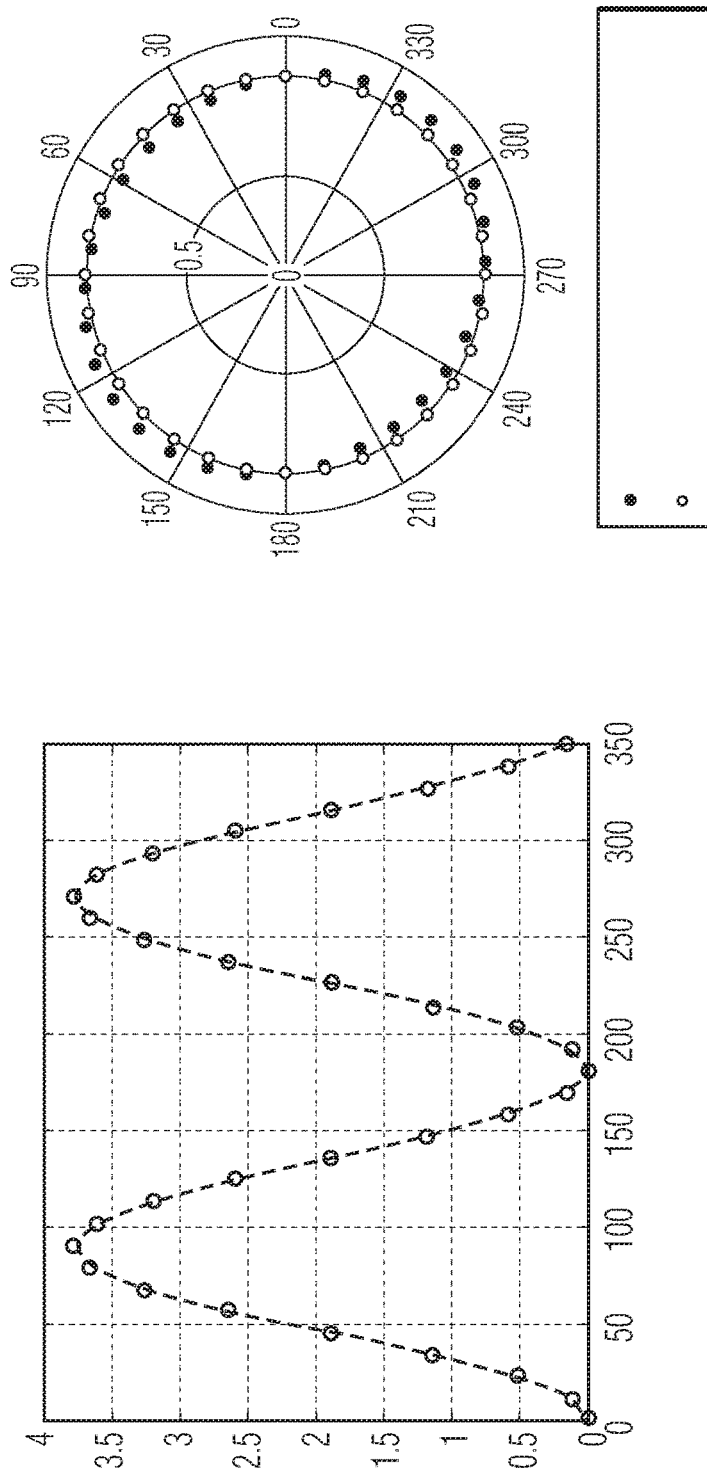
FIG. 2B illustrates the influence of phase rotator phase imbalance on phase error at the mixer of the multi-channel RF transmitter.

The second influence of interest is the influence of phase rotator phase imbalance on phase error. This influence is illustrated in FIG. 2B, which illustrates phase errors of +1.9 degrees maximum caused by phase imbalance of 3.8 degrees. With this phase imbalance, the output phase is defined by [cos(LO) cos(φ)−sin(LO) sin(φ+3.8)]. The left graph in FIG. 2B is a graph of phase errors over different phase codes from 0 to 360 degrees, which shows phase errors of +3.8/2 degrees maximum. The right graph in FIG. 2B is a polar coordinate graph showing points for an ideal signal versus points for a signal with phase rotator phase imbalance at the mixer 112 of the multi-channel RF transmitter 100.

Figure 2C:
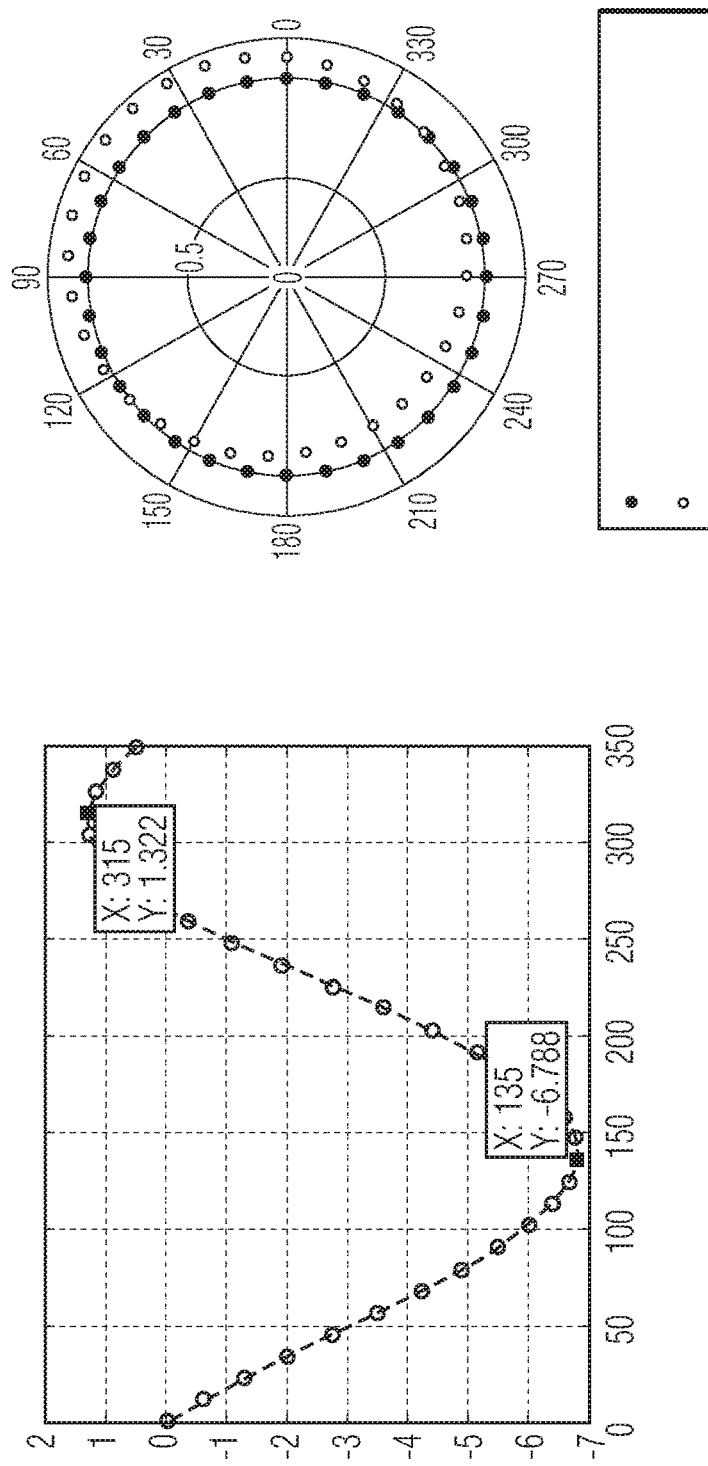
FIG. 2C illustrates the influence of phase rotator LO-to-RF leakage on phase error at the mixer of the multi-channel RF transmitter.

The third influence of interest is the influence of phase rotator LO-to-RF leakage on phase error. Phase rotator LO-to-RF leakage is the resultant leakage from the I and Q signals in the phase rotators 128 and 132, which involves the leakage from the LO, which is input to each of the phase rotators, to the RF signal, which is the output from each mixer in each of the phase rotators. This influence is illustrated in FIG. 2C, which illustrates phase error of +4 degrees caused by LO-to-RF leakage of the I and Q mixer of the phase rotator, where the leakage for I is 26 dB and the leakage for Q is 26 dB. The left graph in FIG. 2C is a graph of phase errors over different phase codes from 0 to 360 degrees, which shows the phase errors of +1.32 degrees to −6.788 degrees. The right graph in FIG. 2C is a polar coordinate graph showing points for an ideal signal versus points for a signal with phase rotator LO-to-RF leakage at the mixer 112 of the multi-channel RF transmitter 100.

Figure 2D:
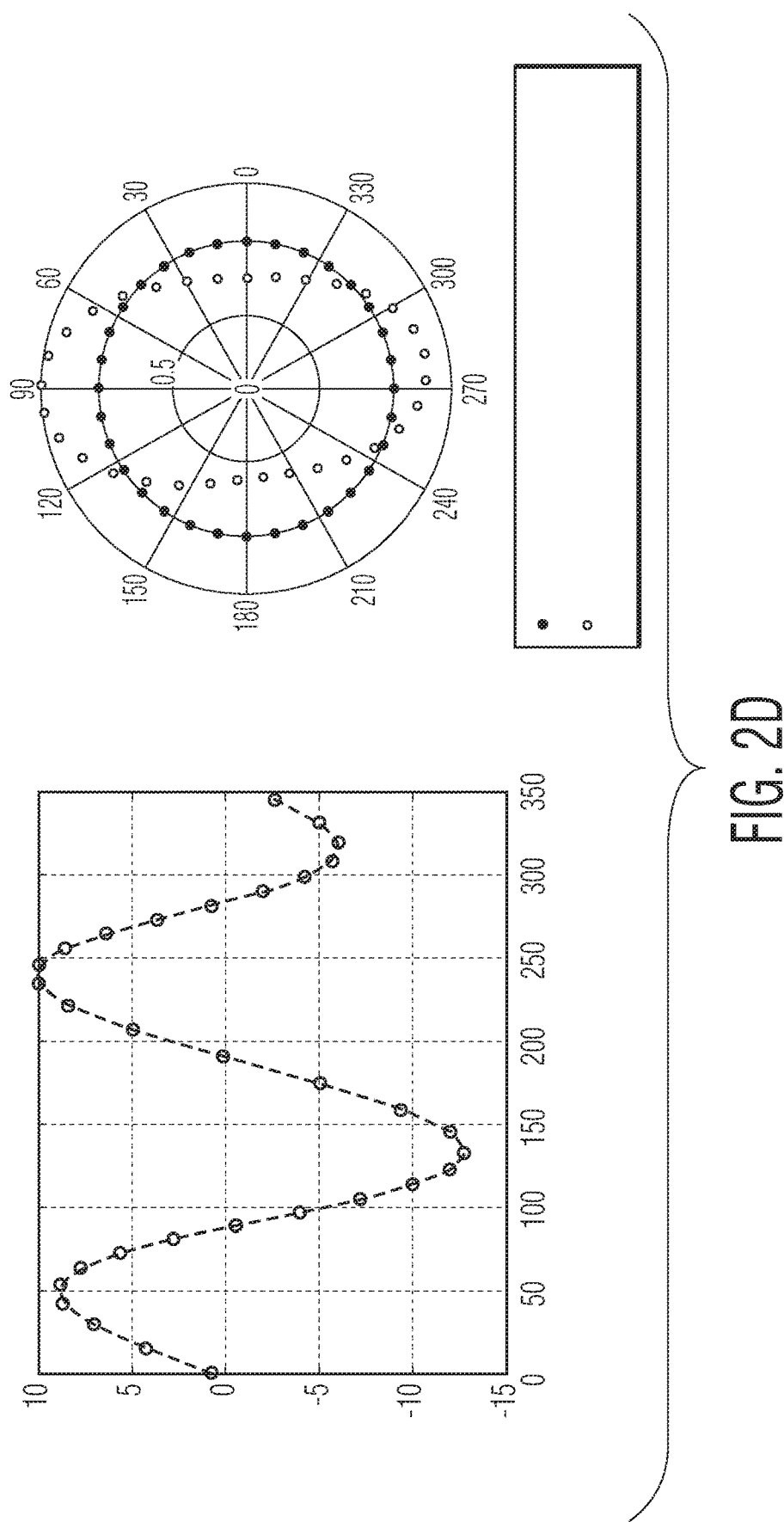
FIG. 2D illustrates the combined effect of the three influences shown in FIGS. 2A-2C.

The combined effect of these influences or phase influencing factors is illustrated in FIG. 2D, which illustrates phase error of +/−11 degrees caused by gain imbalance of 2.8 dB, phase imbalance of 3.8 degrees and LO-to-RF leakage of 23 dB. The left graph in FIG. 2D is a graph of phase errors over different phase codes from 0 to 360 degrees, which shows phase errors of +10 degrees to −13 degrees. The right graph in FIG. 2D is a polar coordinate graph showing points for an ideal signal versus points for a signal with phase rotator gain imbalance, phase imbalance and LO-to-RF leakage at the mixer 112 of the multi-channel RF transmitter 100.

Figure 3:
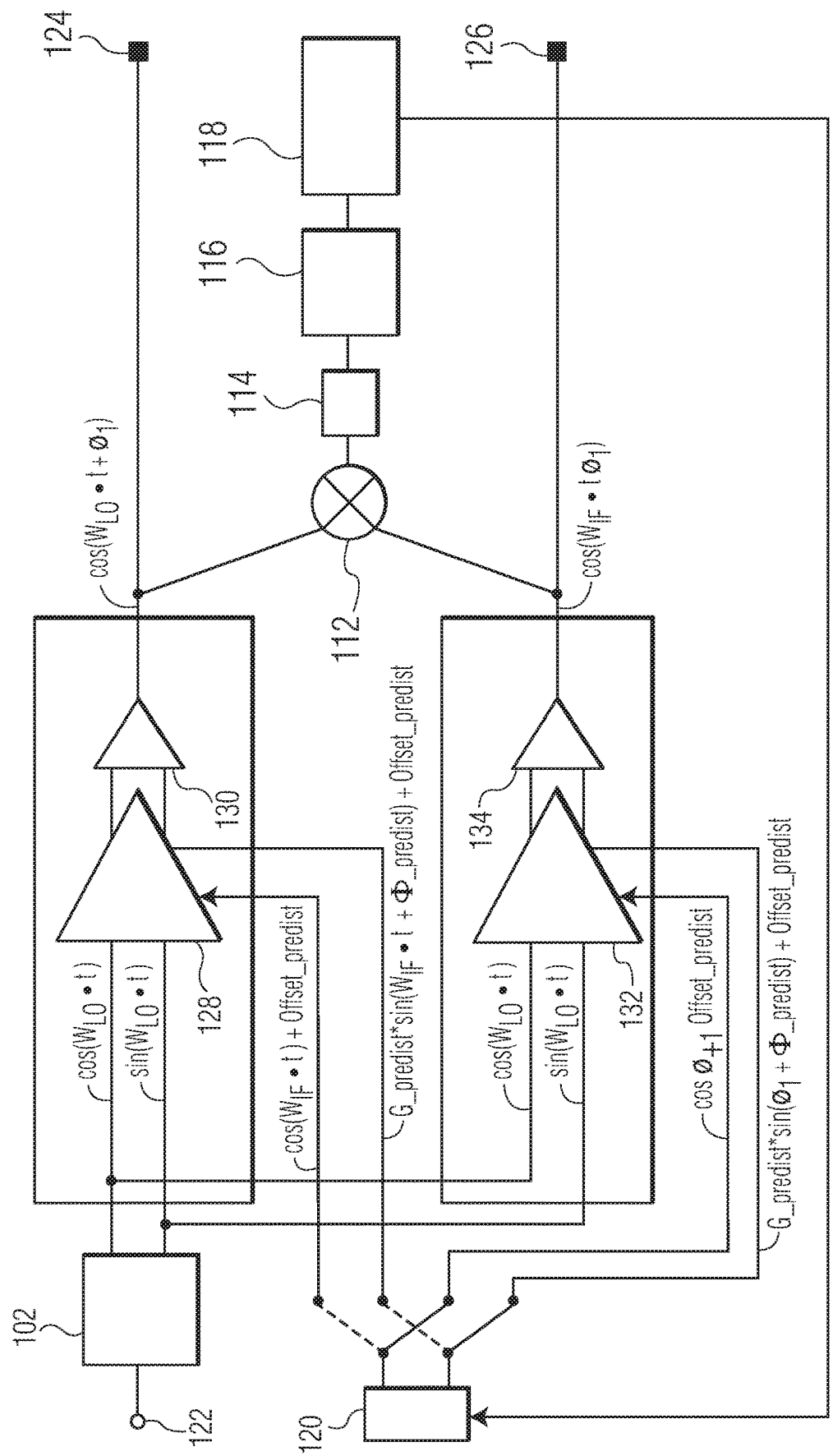
FIG. 3 illustrates modified signals being used in the multi-channel RF transmitter to compensate for phase rotator LO-to-RF leakage, phase rotator phase imbalance and phase rotator gain imbalance.

In order to calibrate the phase shifters 128 and 132 of the first and second channel transmitter modules TX1 and TX2 to reduce these influences, the multi-channel RF transmitter 100 is designed to perform three successive calibrations, which may be done in any order, in what will be referred to herein as a three-step calibration process. These three calibrations include (1) calibration of LO-to-RF leakage, (2) calibration of phase rotator gain imbalance and (3) calibration of phase rotator phase imbalance. These calibrations involve selecting compensation values to adjust or modify the signals from the DDS 120 to the phase shifters 128 and 132 to compensate for these influences. This is illustrated in FIG. 3, which shows a modified IF signal that is applied to the phase rotator 128 of the first second channel transmitter module TX1 and a modified phase code signal that is applied to the phase rotator 132 of the second channel transmitter module TX2 (DACs 104, 106, 108 and 110 are not illustrated in this figure). As shown in FIG. 3, the modified signals include a DC offset value Offset_predist to compensate for phase rotator LO-to-RF leakage, a phase value φ_predist to compensate for phase rotator phase imbalance, and a gain value G_predist to compensate for phase rotator gain imbalance. The basis for using these values on the signals on the phase rotators is illustrated in FIGS. 4A and 4B.

Figure 4A:
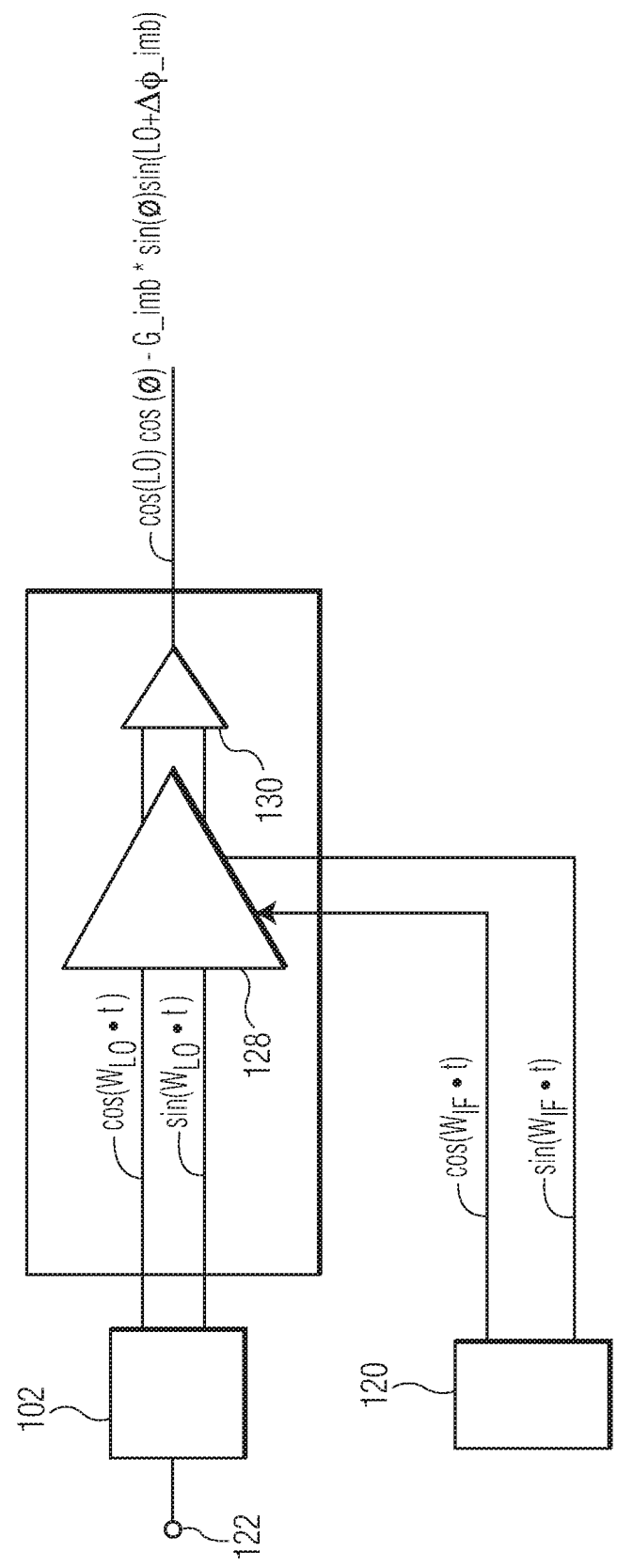
FIG. 4A illustrates an unmodified IF signal being applied to a phase rotator of a first channel module of the multi-channel RF transmitter to produce an output signal with phase error.

FIG. 4A shows the phase rotator 128 of the first channel transmitter module TX1 that receives the complex (I/Q) RF signal consisting of (I) signal component $\cos(\omega_{LO}*t)$ and (Q) signal component $\sin(\omega_{LO}*t)$ from the coupler module 102. In addition, the phase rotator 128 received an IF signal consisting of a phase shift signal component $\cos(\omega_{IF}*t)$ and a phase shift signal component $\sin(\omega_{IF}*t)$. In an ideal case, the output of the phase rotator would be cos(LO) cos(φ)− sin(φ) sin(LO). However, if there is phase and gain imbalances, the actual output of the phase rotator 128 would be cos(LO) cos(φ)−G _imb*sin(φ) sin(LO+Δφ_imb), where G_imb is the gain imbalance and Δφ_imb is the phase imbalance, as illustrated in FIG. 4A. Thus, the actual output of the phase rotator 128 would include phase error with respect to the ideal case. This phase error can be theoretically canceled by modifying the IF signal applied to the phase rotator 128.

Figure 4B:
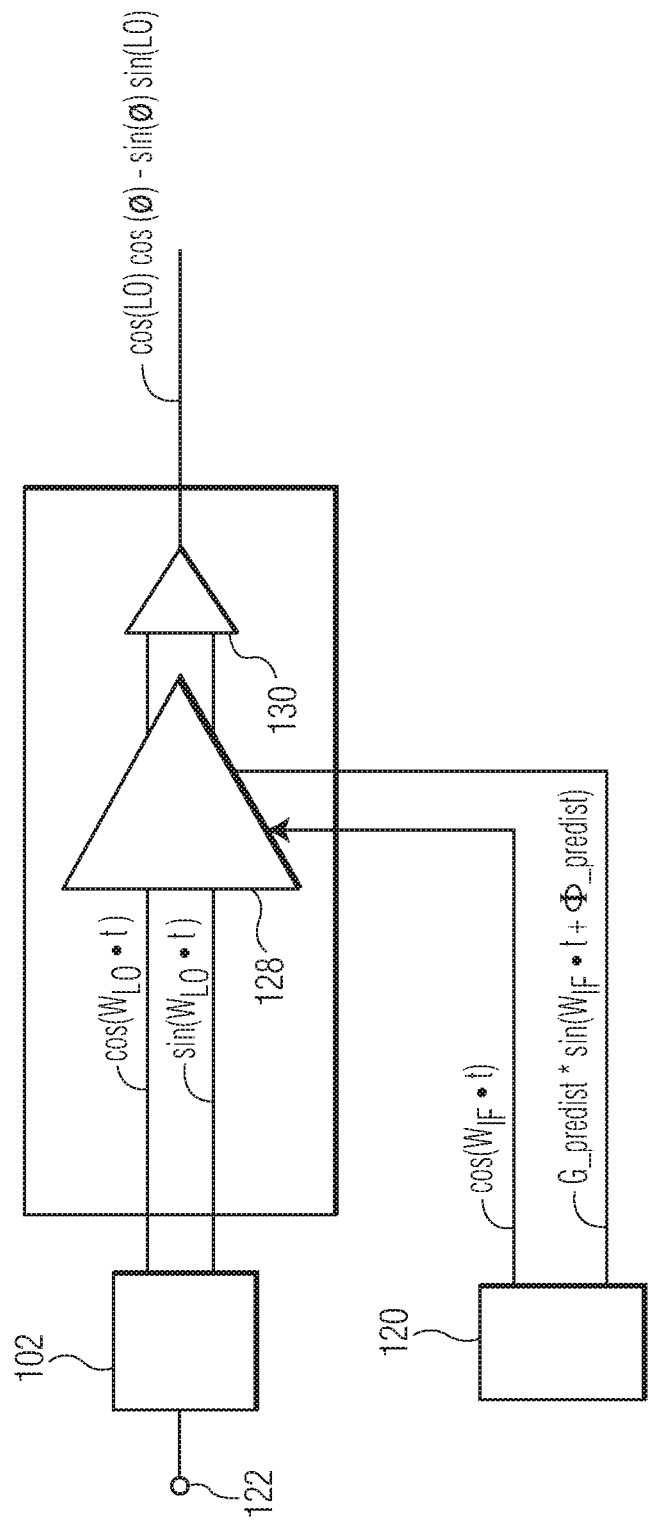
FIG. 4B illustrates a modified IF signal being applied to the phase rotator of the first channel module of the multi-channel RF transmitter to cancel out the phase error in the output signal.

As illustrated in FIG. 4B, the IF signal applied to the phase rotator 128 has been modified to a signal consisting of a phase shift signal component $\cos(\omega_{IF}*t)$ and a second phase shift signal G_predist*$\sin(\omega_{IF}*t+\phi\_predist)$, where $G_{predist}$=1/G_imb and Δφ_predist=Δφ_imb. Using this modified IF signal, the output of the phase rotator would be cos(LO) cos(φ)−G _imb*G_predist*sin(φ+Δφ_predist) sin (LO+Δφ_imb) so that the phase error caused by the gain imbalance and the phase imbalance would be canceled out.

Figure 5B:
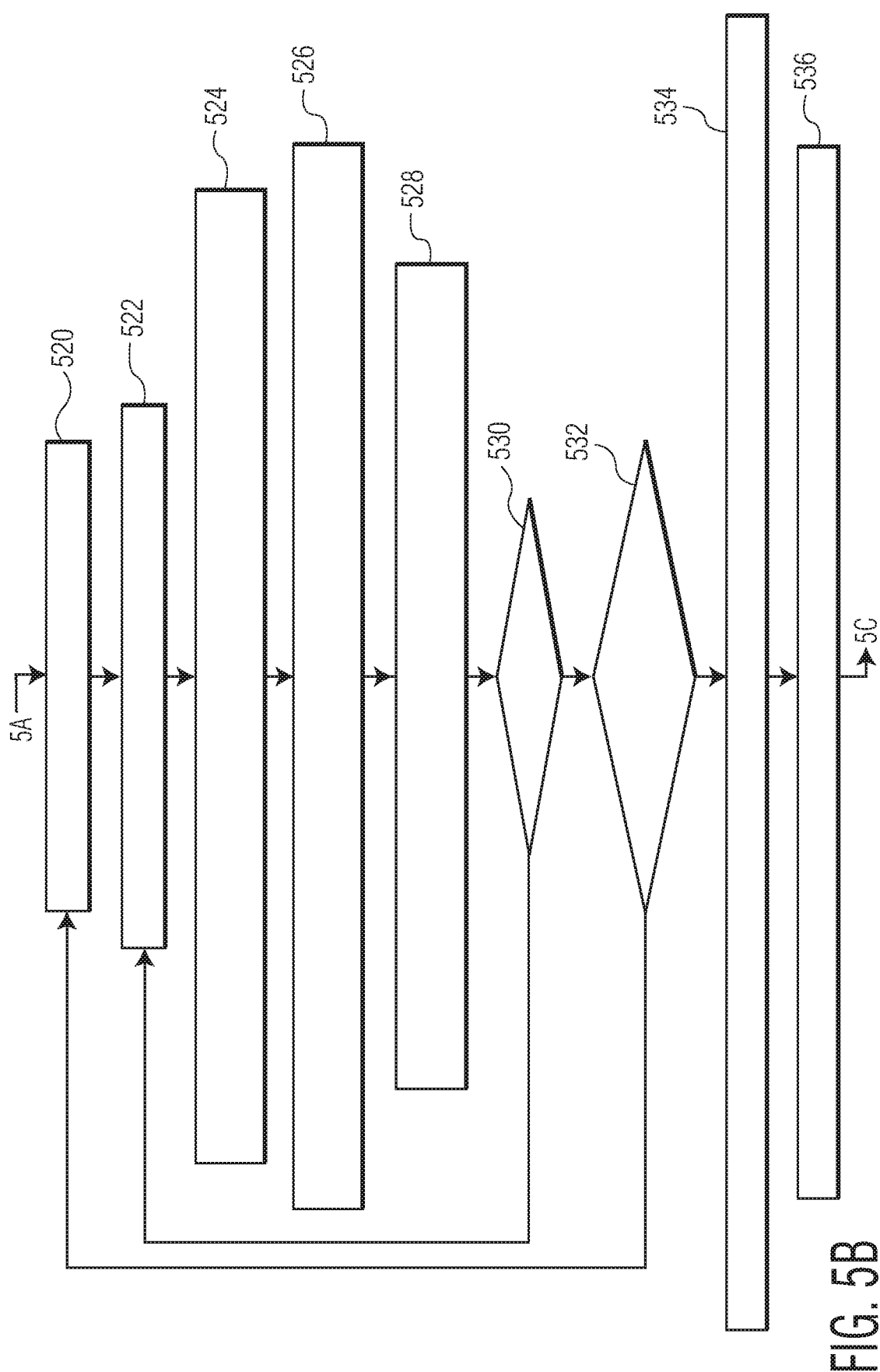

The three-step calibration process performed by the multi-channel RF transmitter 100 in accordance with an embodiment is described with reference to a process flow diagram of FIGS. 5A, 5B and 5C. In this embodiment, the three-step calibration process involves the following order of performing calibrations: LO-to-RF leakage calibration (FIG. 5A), gain imbalance calibration (FIG. 5B) and phase imbalance calibration (FIG. 5C). However, as previously mentioned, these three calibrations may be performed in any order, such as gain imbalance calibration, LO-to-RF leakage calibration and then phase imbalance calibration.

As shown in FIG. 5A, the three-step calibration process begins at block 502, where a first LO-to-RF leakage compensation value ("DC offset value") is selected. A LO-to-RF leakage compensation value is a value to produce an opposite offset of an offset caused by LO-to-RF leakage. In an embodiment, the LO-to-RF leakage compensation value may represent an offset value in mV. Next, at block 504, a phase code corresponding to a first phase is selected. Next, at block 506, an IF signal with the selected LO-to-RF leakage compensation value is applied to the phase shifter 128 of the first channel transmitter module TX1. Next, at block 508, the phase code with the same selected LO-to-RF leakage compensation value is applied to the phase shifter 132 of the second channel transmitter module TX2. Next, at block 510, the resultant phase error due to the phase errors in the outputs of the phase shifters 128 and 132 is computed using the FFT results from the FFT module 116 and stored in a storage accessible by the phase error controller 118. Next, at block 512, a determination is made whether the current phase code corresponds to the last phase code to be used. If the current phase code is not the last phase code for this iteration, then the process proceeds back to block 504, where the next phase code is selected to be applied to the phase shifter 132 of the second channel transmitter module TX2, while the IF signal is applied to the phase shifter 128 of the first channel transmitter module TX1, to compute another resultant phase error due to the phase errors in the outputs of the phase shifters 128 and 132 of the first and second channel transmitter modules TX1 and TX2 for the selected phase code. In an embodiment, the phase codes correspond to 0 to 360 degrees in fixed steps, e.g., 45 degrees. Thus, in this embodiment, there will be eight phase codes that need to be used. If the current phase code is the last phase code for this iteration, then the process proceeds to block 514.

At block 514, a determination is made whether the current LO-to-RF leakage compensation value is the last compensation value to be used. If the current LO-to-RF leakage compensation value is not the last value, then the process proceeds back to block 502, where the next LO-to-RF leakage compensation value is selected to be used. In an embodiment, the LO-to-RF leakage compensation values correspond to 20 dB to 45 dB in predefined increments, e.g., 1 or 5 dB, which can be achieved by incrementing the least significant bit (LSB) of the DACs 104, 106, 108 and 110. However, if the current LO-to-RF leakage compensation value is the last value, then the process proceeds to block 516.

At block 516, the phase error controller 118 sums the resultant phase errors associated with the different phase codes for each of the LO-to-RF leakage compensation values. Next, at block 518, the phase error controller 118 selects the LO-to-RF leakage compensation value with the minimum summed resultant phase error value to be used as the LO-to-RF leakage compensation value for the other calibrations. Thus, the optimal LO-to-RF leakage compensation value has been selected for the phase shifters 128 and 132 of the first and second channel transmitter modules TX1 and TX2.

As shown in FIG. 5B, the gain imbalance calibration of the three-step calibration process begins at block 520, where a first gain imbalance compensation value is selected. Next, at block 522, a phase code corresponding to a first phase is selected. Next, at block 524, an IF signal with the optimal LO-to-RF leakage compensation value and the selected gain imbalance compensation value is applied to the phase shifter 128 of the first channel transmitter module TX1. Next, at block 526, the phase code with the optimal LO-to-RF leakage compensation value and the same selected gain imbalance compensation value is applied to the phase shifter 132 of the second channel transmitter module TX2. Next, at block 528, the resultant phase error due to the phase errors in the outputs of the phase shifters 128 and 132 of the first and second channel transmitter modules TX1 and TX2 is computed using the FFT results from the FFT module 116 and stored in a storage accessible by the phase error controller 118. Next, at block 530, a determination is made whether the current phase code corresponds to the last phase code to be used. If the current phase code is not the last phase code for this iteration, then the process proceeds back to block 522, where the next phase code is selected to be applied to the phase shifter 132 of the second channel transmitter module TX2, while the IF signal is applied to the phase shifter 128 of the first channel transmitter module TX1, to compute another resultant phase error due to the phase errors in the outputs of the phase shifters 128 and 132 of the first and second channel transmitter modules TX1 and TX2 for the selected phase code. In an embodiment, the phase codes correspond to 0 to 360 degrees in fixed steps, e.g., 45 degrees. Thus, in this embodiment, there will be eight phase codes that need to be used. If the current phase code is the last phase code for this iteration, then the process proceeds to block 532.

At block 532, a determination is made whether the current gain imbalance compensation value is the last value to be used. If the current gain imbalance compensation value is not the last value, then the process proceeds back to block 520, where the next gain imbalance compensation value is selected to be used. In an embodiment, the gain imbalance compensation values correspond to −4 dB to +4 dB in predefined increments, e.g., 0.1 dB. However, if the current gain imbalance compensation value is the last value, then the process proceeds to block 530.

At block 534, the phase error controller 118 sums the resultant phase errors associated with different phase codes for each of the gain imbalance compensation values, Next, at block 536, the phase error controller 118 selects the gain compensation value with the minimum summed resultant phase error value to be used as the gain imbalance compensation value for the remaining calibration. Thus, the optimal gain imbalance compensation value has been selected for the phase shifters 128 and 132 of the first and second channel transmitter modules TX1 and TX2, in addition to the optimal LO-to-RF leakage compensation value.

As shown in FIG. 5C, the phase imbalance calibration of the three-step calibration process begins at block 538, where a first phase imbalance compensation value is selected. Next, at block 540, a phase code corresponding to a first phase is selected. Next, at block 542, an IF signal with the optimal LO-to-RF leakage compensation value, the optimal gain imbalance compensation value and the selected phase imbalance compensation value is applied to the phase shifter 128 of the first channel transmitter module TX1. Next, at block 544, the phase code with the optimal LO-to-RF leakage compensation value, the optimal gain imbalance compensation value and the selected phase imbalance compensation value is applied to the phase shifter 132 of the second channel transmitter module TX2. Next, at block 546, the resultant phase error due to the phase errors in the outputs of the phase shifters 128 and 132 of the first and second channel transmitter modules TX1 and TX2 is computed using the FFT results from the FFT module 116 and stored in a storage accessible by the phase error controller 118. Next, at block 548, a determination is made whether the current phase code corresponds to the last phase code to be used. If the current phase code is not the last phase code for this iteration, then the process proceeds back to block 540, where the next phase code is selected to be applied to the phase shifter 132 of the second channel transmitter module TX2, while the IF signal is applied to the phase shifter 128 of the first channel transmitter module TX1, to compute the phase error in the outputs of the phase shifters 128 and 132 of the first and second channel transmitter modules TX1 and TX2 for the selected phase code. In an embodiment, the phase codes correspond to 0 to 360 degrees in fixed steps, e.g., 45 degrees. Thus, in this embodiment, there will be eight phase codes that need to be used. If the current phase code is the last phase code for this iteration, then the process proceeds to block 550.

At block 550, a determination is made whether the current phase imbalance compensation value is the last value to be used. If the current phase imbalance compensation value is not the last value, then the process proceeds back to block 538, where the next phase imbalance compensation value is selected to be used. In an embodiment, the phase compensation values correspond to −5 degrees to +5 degrees in predefined increments, e.g., 0.2 degrees. However, if the current phase imbalance compensation value is the last value, then the process proceeds to block 552.

At block 552, the phase error controller 118 sums the resultant phase errors associated with different phase codes for each of the phase imbalance compensation values. Next, at block 554, the phase error controller 118 selects the phase imbalance compensation value with the minimum summed resultant phase error value. Thus, the optimal phase imbalance compensation value has been selected for the phase shifters 128 and 132 of the first and second channel transmitter modules TX1 and TX2, in addition to the optimal LO-to-RF leakage and gain imbalance compensation values. These compensation values can then be used to modify the signals from the DDS 120 used on the phase shifters 128 and 132 of the first and second channel transmitter modules TX1 and TX2 to ensure that their outputs are the desired signals with respect to phase and amplitude.

Figure 6:
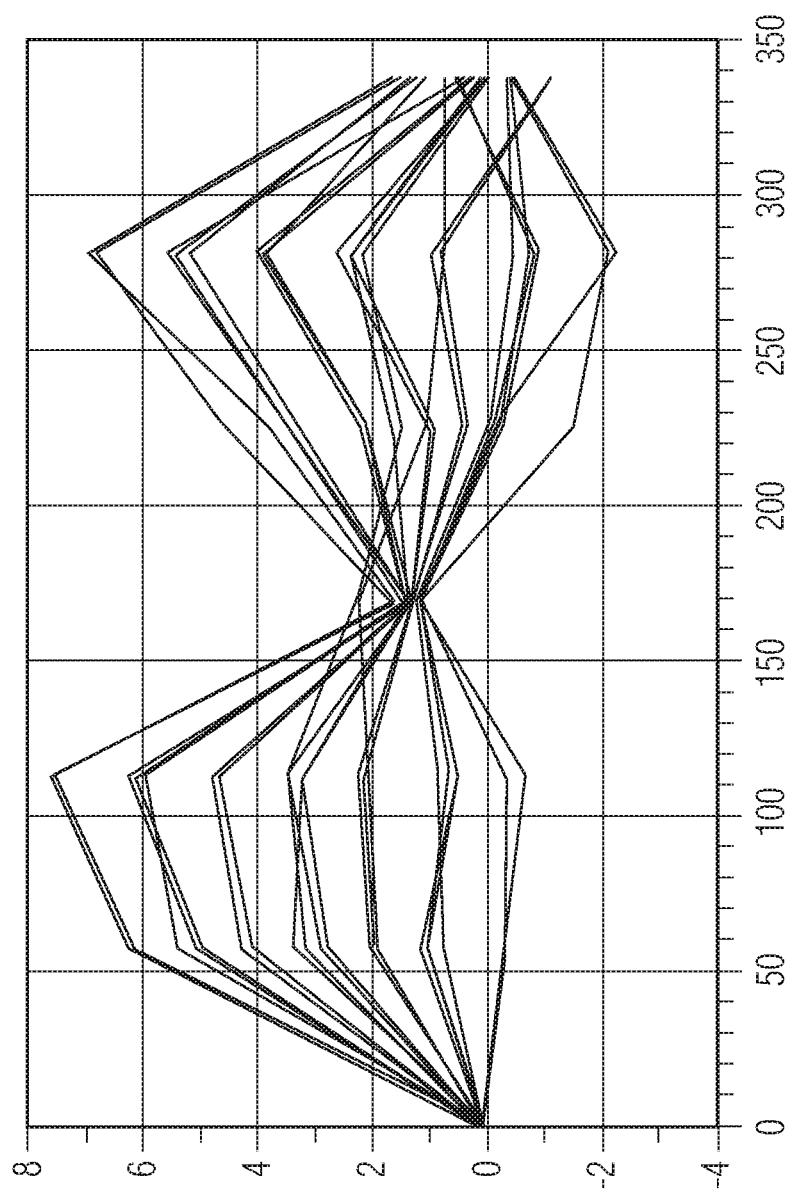
FIG. 6 is a graph showing phase errors for different phase compensation values during a phase imbalance calibration in accordance with an embodiment of the invention.

The different phase errors that are captured by the phase error controller 118 for the different compensation values during each of the three calibrations are illustrated in FIG. 6, which is a graph showing phase errors for different phase compensation values during the phase imbalance calibration. In this graph, each line represents the phase errors for a particular phase compensation value.

In simulations, for gain imbalance=2.4 dB, phase imbalance=3.3 degrees and LO-to-RF leakage=23 dB, the phase error is +/−10 degrees before the three-step calibration process depicted in FIGS. 5A-5C. After the three-step calibration process, the phase error is less than or equal to 0.5 degrees.

Figure 7A:
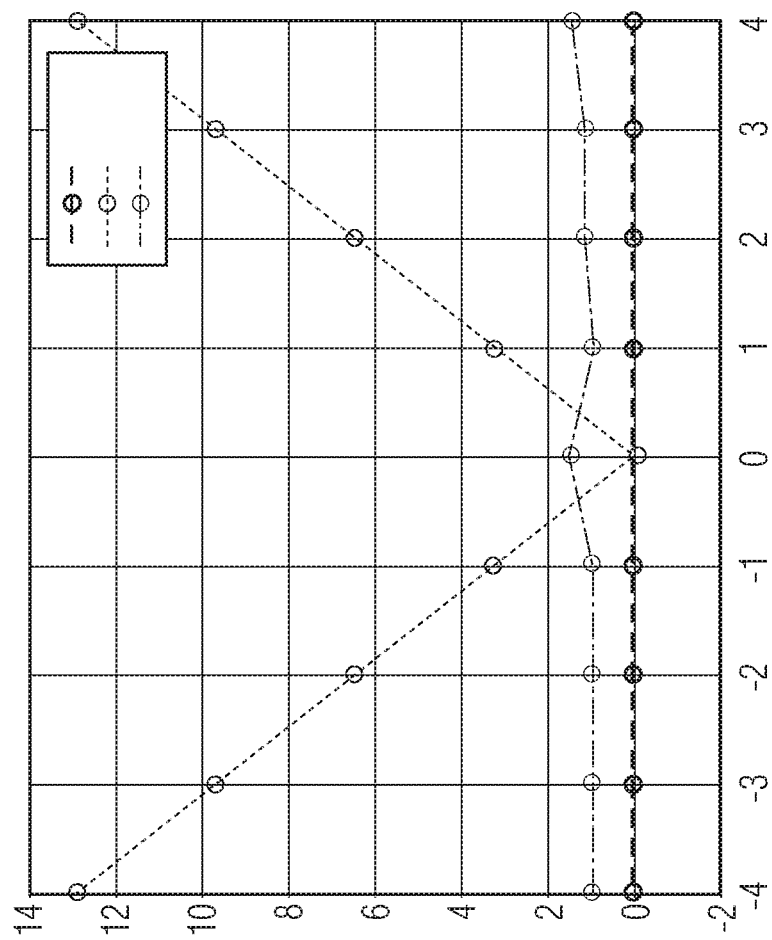
FIG. 7A shows phase errors due to gain imbalance for no calibration, for calibration using 8-bit digital-to-analog converters (DACs) and for calibration using 15-bit DACs in accordance with embodiments of the invention.
Figure 7B:
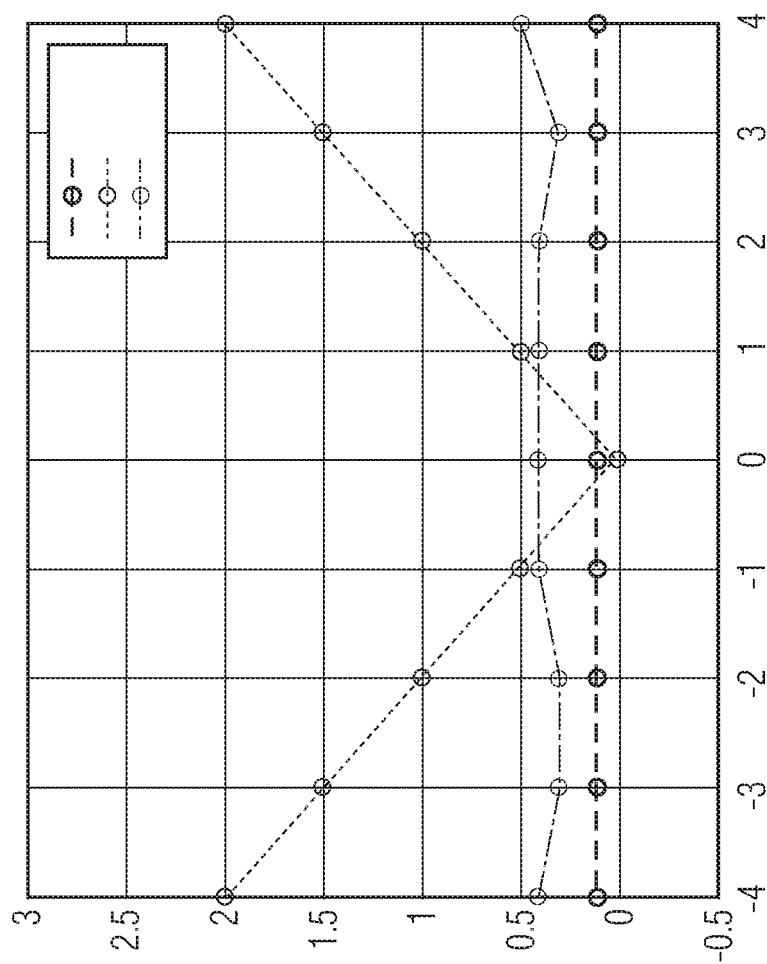
FIG. 7B shows phase errors due to phase imbalance for no calibration, for calibration using 8-bit digital-to-analog converters (DACs) and for calibration using 15-bit DACs in accordance with embodiments of the invention.
Figure 7C:
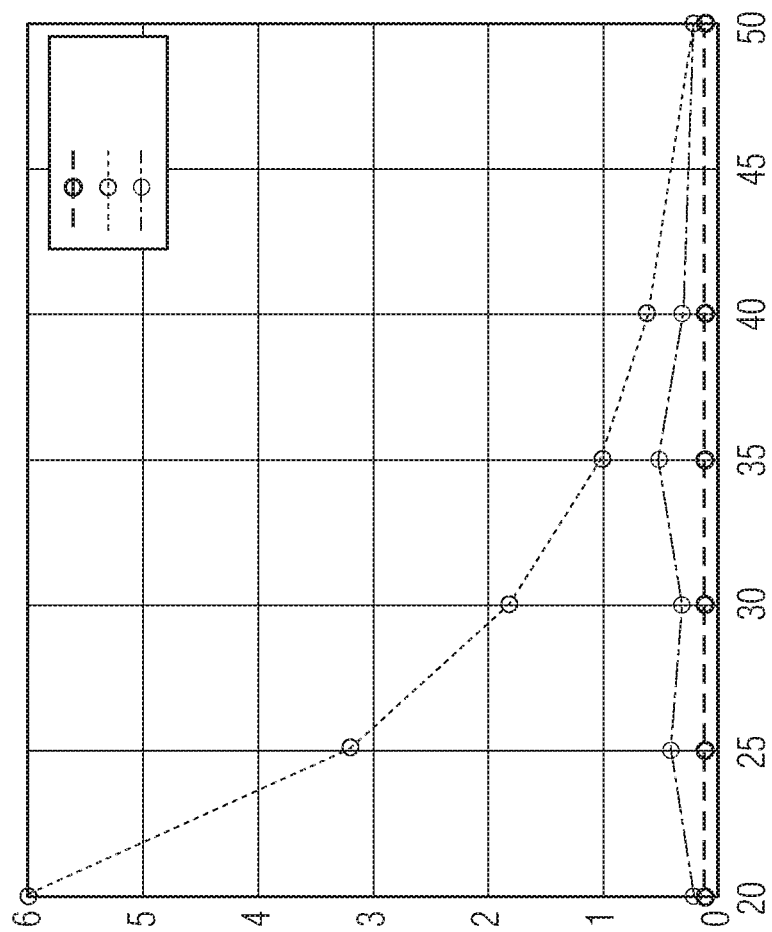
FIG. 7C shows phase errors due to LO-to-RF leakage for no calibration, for calibration using 8-bit digital-to-analog converters (DACs) and for calibration using 15-bit DACs in accordance with embodiments of the invention.

The results of the three-step calibration process can depend on the resolution of the DACs 104, 106, 108 and 110, and thus, can be reduced by using different types of DACs. This is illustrated in FIGS. 7A, 7B and 7C. FIG. 7A shows the phase errors due to gain imbalance for no calibration, for calibration using 8-bit DACs and for calibration using 15-bit DACs. FIG. 7B shows the phase errors due to phase imbalance for no calibration, for calibration using 8-bit DACs and for calibration using 15-bit DACs. FIG. 7C shows the phase errors due to LO-to-RF leakage for no calibration, for calibration using 8-bit DACs and for calibration using 15-bit DACs.

The described three-step calibration process calibrates both the first and second transistor modules TX1 and TX2. The same three-step calibration process can be applied with the first and second transistor modules TX1 and TX2 reversed. The results would be similar since the first and second transistor modules TX1 and TX2 are similar. Although the three-step calibration process has been described using two channel transmitter modules, the described three-step calibration process may be extended for three channel transmitter modules, which may simply involve different connections between the three channel transmitter modules, the DDS 120 and the mixer 112 so that only two of the three transmitter modules are involved for each three-step calibration process.

Figure 8:
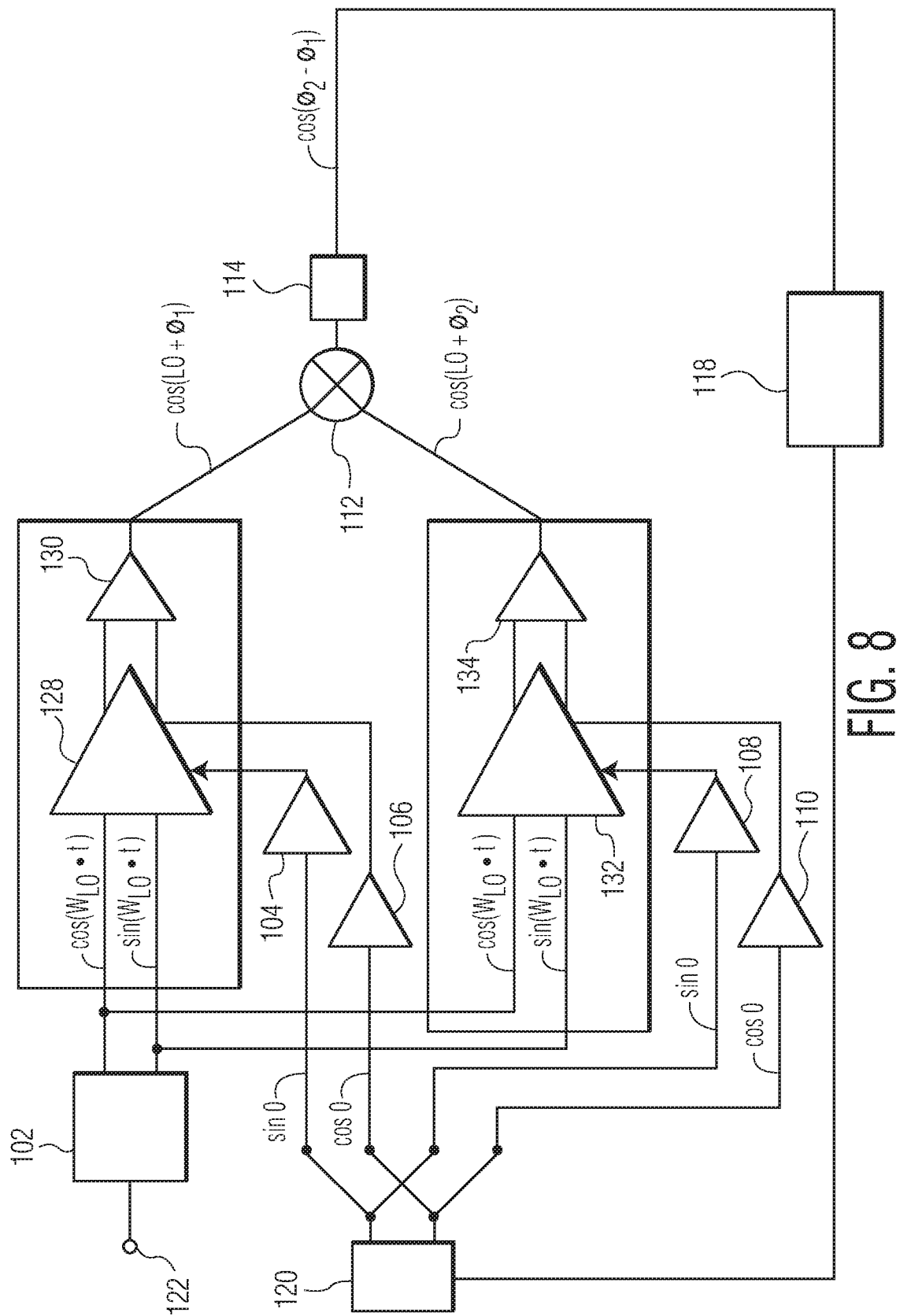
FIG. 8 illustrates a phase alignment process to phase align between the first and second channel modules of the multi-channel RF transmitter in accordance with an embodiment of the invention.

After the three-step calibration process, a phase alignment process should be performed to phase align between the first and second channel transmitter modules TX1 and TX2. This phase alignment process will be described with reference to FIG. 8. In this phase alignment process, the same phase code (phase code 0) with the same predistortion or compensation is applied on both the first and second channel transmitter modules TX1 and TX2 from the DDS 120. In addition, a complex (I/Q) RF signal consisting of a first (I) signal component $\cos(\omega_{LO}*t)$ and a second (Q) signal component $\sin(\omega_{LO}*t)$ is applied to both the first and second channel transmitter modules TX1 and TX2 from the I/Q coupler device 102. The outputs from the first and second channel transmitter modules TX1 and TX2 will be $\cos(LO+\theta_1)$ and $\cos(LO+\theta_2)$, respectively. Thus, the output of the ADC 114 will be $\cos(\theta_2-\theta_1)$. The phase error controller 118 receives the signal from the ADC 114 without FFT and extracts $(\theta_2-\theta_1)$ using the arccosine function to determine the phase misalignment between the first and second channel transmitter modules TX1 and TX2. In an alternative embodiment, the phase difference $(\theta_2-\theta_1)$ can be extracted by applying FFT to the received signal from the ADC 114 and using the arctangent function. Using this information, the phase error controller 118 provides a phase offset to the DDS 120 to compensate for the phase misalignment so that the DDS modifies signals to the first and second transmitter modules TX1 and TX2 so that $\theta_2-\theta_1$ is zero or close to zero (e.g., <1 degrees) to phase align the first and second channel transmitter modules TX1 and TX2.

As the multi-channel RF transmitter 100 operates, one or both of the first and second channel transmitter modules TX1 and TX2 may experience phase error drift due to various factors, which may pose a safety threat for certain applications, such as autonomous driving or collision avoidance. Thus, the multi-channel RF transmitter may periodically perform a safety check on each of the first and second channel transmitters.

In an embodiment, a safety check of the multi-channel RF transmitter 100 involves checking periodically, e.g., daily, weekly, monthly or other appropriate predefined intervals, the phase error level when compensation has been applied. After compensation for the first time for a particular phase code, the phase error is measured, and the value of the phase error for the phase code is loaded in a register with a programmed tolerance to be used as a reference phase error. In case of a problem in one or both of the first and second channel transmitter modules TX1 and TX2, the phase errors for different phase codes will start to drift, which can be measured as phase differences, or delta phases, between the current phase errors and the reference phase errors. If any of the phase differences due to the drift is higher than a first programmable threshold, then a first flag is generated. If the sum of the phase differences is greater than a second programmable threshold, a second flag is generated. The flags are sent to a microcontroller unit, so that an appropriate action can be initiated in response to the flags, e.g., disabling the multi-channel RF transmitter for safety concerns.

FIG. 9 is a process flow diagram of a method of calibrating a multi-channel RF transmitter in accordance with an embodiment of the invention. At block 902, an IF signal with different compensation values is applied on a first phase rotator in a first channel transmitter module of the multi-channel RF transmitter. The different compensation values are designed to compensate for a particular phase influencing factor, such as a LO-to-RF leakage, a gain imbalance or a phase imbalance. At block 904, phase codes with the same different compensation values for different phases are applied on a second phase rotator in a second channel transmitter module of the multi-channel RF transmitter. At block 906, resultant phase errors due to phase errors of the first and second channel modules for the different compensation values are measured. At block 908, based on the resultant phase errors, one of the different compensation values is selected to be used as a calibrated compensation value for the first phase rotator in the first channel transmitter module and for the second phase rotator in the second channel transmitter module to compensate for the particular phase influencing factor.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method of calibrating a multi-channel radio frequency (RF) transmitter, the method comprising:
    applying, by way of a direct digital synthesizer (DDS), an intermediate frequency (IF) signal with pre-designated different compensation values on a first phase rotator in a first channel transmitter module of the multi-channel RF transmitter, wherein the pre-designated different compensation values are designed to compensate for a particular phase influencing factor;
    applying phase codes with the pre-designated different compensation values for different phases on a second phase rotator in a second channel transmitter module of the multi-channel RF transmitter;
    measuring resultant phase errors due to phase errors of the first and second channel transmitter modules for the pre-designated different compensation values; and
    based on the resultant phase errors, selecting one of the pre-designated different compensation values to be used as a calibrated compensation value for the first phase rotator in the first channel transmitter module and for the second phase rotator in the second channel transmitter module to compensate for the particular phase influencing factor.

2. The method of claim 1, wherein the pre-designated different compensation values include DC offset values to compensate for local oscillator to RF leakage, gain values to compensate for gain imbalance, or phase values to compensate for phase imbalance.

3. The method of claim 1, further comprising applying a complex I/Q signal to the first and second phase rotators from an I/Q coupler module that receives a local oscillator signal.

4. The method of claim 1, wherein measuring the resultant phase errors includes mixing outputs of the first and second channel transmitter modules to generate a mixed signal and performing fast Fourier transform (FFT) on the mixed signal to measure the resultant phase error.

5. The method of claim 4, wherein measuring the resultant phase errors further includes using arctangent function on results of the FFT to measure the resultant phase error.

6. The method of claim 1, wherein selecting one of the pre-designated different compensation values includes summing resultant phase errors for the pre-designated different compensation values to produce summed resultant phase error values corresponding to the pre-designated different compensation values and selecting a minimum value from the summed resultant phase error values to select the calibrated compensation value.

7. The method of claim 1, further comprising:
    applying a particular phase code with the calibrated compensation value on the first phase rotator in the first channel transmitter module and the second phase rotator in the second channel transmitter module to produce output signals from the first and second channel transmitter modules;
    determining a phase misalignment between the first and second channel transmitter modules using the output signals; and
    providing a phase offset to compensate for the phase misalignment so that signals to the first and second channel transmitter modules are modified to phase align the first and second channel transmitter modules.

8. The method of claim 1, further comprising:
    applying the signal with the selected compensation value on the first phase rotator in the first channel transmitter module;
    applying the phase codes with the selected compensation value on the second phase rotator in the second channel transmitter module;
    measuring phase differences between outputs of the first and second channel transmitter modules;
    comparing the phase difference to at least one programmed threshold; and
    generating a flag to indicate phase drift when at least one of the phase differences is greater than the at least one programmed threshold.

9. A multi-channel radio frequency (RF) transmitter comprising:
    a first channel transmitter module comprising a first phase rotator;
    a second channel transmitter module comprising a second phase rotator;
    a mixer to combine outputs of the first and second channel transmitter modules; and a digital processing system operatively connected to the first and second channel transmitter modules and the mixer, the digital processing system being configured to:

apply, by way of a direct digital synthesizer (DDS), an intermediate frequency (IF) signal with pre-designated different compensation values on the first phase rotator, wherein the pre-designated different compensation values are designed to compensate for a particular phase influencing factor;

apply phase codes with the pre-designated different compensation values for different phases on the second phase rotator;

measure resultant phase errors due to phase errors of the first and second channel transmitter modules for the pre-designated different compensation values; and based on the resultant phase errors, select one of the pre-designated different compensation values to be used as a calibrated compensation value for the first phase rotator in the first channel transmitter module and for the second phase rotator in the second channel transmitter module to compensate for the particular phase influencing factor.

10. The transmitter of claim 9, wherein the pre-designated different compensation values include DC offset values to compensate for local oscillator to RF leakage, gain values to compensate for gain imbalance, or phase values to compensate for phase imbalance.

11. The transmitter of claim 9, wherein the digital processing system is further configured to apply a complex I/Q signal to the first and second phase rotators from an I/Q coupler module that receives a local oscillator signal.

12. The transmitter of claim 9, further includes an FFT module to perform FFT on a mixed signal from the mixer for a phase error measurement.

13. The transmitter of claim 12, wherein the digital processing system is further configured to use arctangent function on results of the FFT to measure the resultant phase error.

14. The transmitter of claim 9, wherein the digital processing system is further configured to sum the resultant phase errors for the pre-designated different compensation values to produce summed resultant phase error values corresponding to the pre-designated different compensation values and select a minimum value from the summed resultant phase error values to select the calibrated compensation value.

15. The transmitter of claim 9, wherein the digital processing system is further configured to:

apply a particular phase code with the calibrated compensation value on the first phase rotator in the first channel transmitter module and the second phase rotator in the second channel transmitter module to produce output signals from the first and second channel transmitter modules;

determine a phase misalignment between the first and second channel transmitter modules using the output signals; and provide a phase offset to compensate for the phase misalignment so that signals to the first and second channel transmitter modules are modified to phase align the first and second channel transmitter modules.

16. The transmitter of claim 9, wherein the digital processing system is further configured to apply the signal with the selected compensation value on the first phase rotator in the first channel transmitter module.

17. The transmitter of claim 9, wherein the digital processing system is further configured to apply the phase codes with the selected compensation value on the second phase rotator in the second channel transmitter module.

18. The transmitter of claim 9, wherein the digital processing system is further configured to measure phase differences between outputs of the first and second channel transmitter modules.

19. The transmitter of claim 18, wherein the digital processing system is further configured to compare the phase differences to at least one programmed threshold.

20. The transmitter of claim 19, wherein the digital processing system is further configured to generate a flag to indicate phase drift when at least one of the phase differences is greater than the at least one programmed threshold.

* * * * *